Nov. 6, 1962  J. ERKELENS ETAL  3,062,362
MACHINE COMPRISING AN INTERMITTENTLY ROTARY TABLE
Filed April 8, 1958
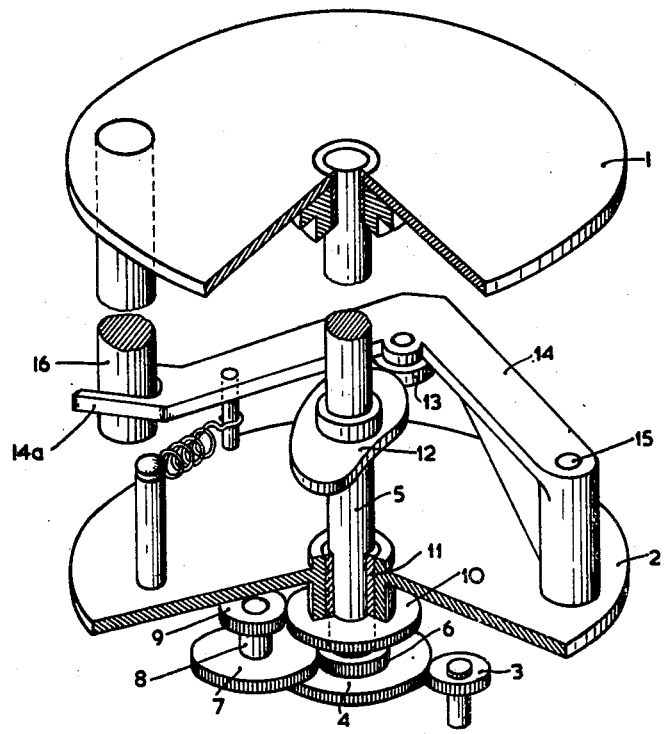
INVENTORS
JOHANNES ERKELENS
JOHANNES NIJBOER
BY
AGENT 3,062,362
MACHINE COMPRISING AN INTERMITTENTLY
ROTARY TABLE
Johannes Erkelens and Johannes Nijboer, Eindhoven,
Netherlands, assignors to North American Philips
Company, Inc., New York, N.Y., a corporation of Delaware
Filed Apr. 8, 1958, Ser. No. 727,226
Claims priority, application Netherlands Apr. 18, 1957
9 Claims. (Cl. 198—209)

The present invention concerns a machine comprising a table which is intermittently rotatable through an angle.

Machines of this type are widely used, the table conveying, for example, products to be made or composed in front of a number of processing stations.

This table has to be moved periodically through an angle with the help of a so-called intermittent drive mechanism. Such mechanisms are often rather complicated and require a sturdy construction, notably if the table has to carry heavy machine parts or the like, which may involve considerable mass forces in moving the table discontinuously.

The present invention has for its object to provide a machine in which these inconveniences are obviated and which permits the use of an intermittent drive mechanism of extremely simple construction.

The machine according to the invention comprises a second table which is continuously rotatable, while the tables are coupled by a drive so that given angular positions of the tables remain complementary, that is to say that associated positions of the tables so remain also during operation.

The tables are preferably superimposed, for example the discontinuously movable table above the continuously movable table.

The invention has the great advantage that heavier parts, for example pumps or welding apparatus, can be stood on the continuously movable table so that no considerable mass forces are involved. This permits the Geneva stop mechanism to be eliminated and to incorporate a mechanism in its place.

In a practical form of the machine according to the invention, a central continuously rotary shaft carries a cam driving a lever, one end of which is pivotally secured to the continuously movable table, while its other end is pivotally secured to the intermittently movable table, the movement of the continuously rotary table being derived from the continuously rotary shaft and the transmission ratio between this shaft and the continuously rotary table corresponding to $$\frac{n}{p+1}$$

where $n$ represents the number of revolutions of the central shaft and $p$ represents the number of positions per revolution of the intermittently driven table.

The central cam of such a machine has a very simple construction.

In order that the invention may be readily carried into effect, an example will now be described in detail with reference to the accompanying drawing, in which the tables are designated by 1 and 2 and shown only very schematically.

The table 2 is driven by a gearwheel 3 actuating a gearwheel 4 on a central shaft 5 at a speed of $n$ rev./min.

The gearwheel 6 keyed to the shaft 5 drives the gearwheel 7 on the intermediate shaft 8 carrying a gearwheel 9 which drives a gearwheel 10 rigidly secured to a bushing 11 which is loosely rotatable about the shaft 5 and connected to the table 2 which is thus driven continuously.

Seated on the shaft 5 is a cam 12 which actuates a roller 13 secured to a lever 14 which is pivotally secured to the table 2 at 15 and with its forked end 14a engages about a pin 16 forming part of the table 1 which is loosely journalled on the shaft 5. The forked member 14a is in continuous pivotal engagement with the pin 16.

During operation, the tables 1 and 2 move in the same direction. However, the table 1 moves intermittently dependent upon the position of cam 12 at any given instant.

Provision is made that the bushing 11 and consequently also the table 2 are driven in a ratio $$\frac{n}{p+1}$$

where $p$ represents the number of positions of the table 1 per revolution, the annular positions of the tables then remaining complementary. The shape of the cam 12 determines the stroke of the discontinuously rotating table 1. More particularly, cam 12 is so shaped and rotated at such speed with respect to the speed at which table 2 is rotated that lever 14 oscillates table 1 relative to table 2 once during each passage from one station to the next station. During one portion of each oscillation table 1 is rotated in a direction opposite the direction of rotation of and at the same speed as table 2 to thereby temporarily maintain table 1 stationary. During the latter part of each oscillation table 1 is rotated in the same direction as and relative to table 2 so as to complete the oscillation when the next station is reached.

What is claimed is:

1. A machine comprising a first table, means to continuously rotate said table, a rotatably mounted second table, means continuously driven by said first table drivingly connected to said second table, means continuously driven in timed relation with said first table and operatively associated with said means continuously driven by said first table for imparting periodic movement to said second table relative to said first table.

2. A machine comprising a first table, means to continuously rotate said table, a rotatably mounted second table, means continuously driven by said first table drivingly connected to said second table, means continuously driven in timed relation with said first table and operatively associated with said means continuously driven by said first table for imparting accelerated-decelerated rotary movement continually to said second table relative to said first table.

3. A machine comprising a massive table, means to continuously rotate said table, a rotably mounted second table of substantially less mass, means continuously driven by said massive table drivingly connected to said second table, means continuously driven in timed relation with said massive table and operatively associated with said means continuously driven by said massive table for imparting continual stepwise periodic movement to said second table.

4. A machine comprising a massive table and a superposed second substantially less massive table, each said table being rotatably journaled on a common shaft, means to continuously rotate said shaft, a reduction gear train driven by said means and drivingly connected with said massive table for continuously rotating said massive table, a lever pivotally connected at one end to said massive table and pivotally connected at its other end to said second table, a cam connected to said common shaft and operatively associated with said lever at a point spaced from the ends thereof, said cam pivoting said lever intermittently to produce stepwise movement of said second table about the pivotal connection with said massive table, and the transmission ratio provided by said reduction gear train between said continuously rotating massive table and said central shaft being $1/(P+1)$ wherein P represents the number of stepwise movements of said less massive table in 360° of rotation.

5. A rotatable support for products in the process of manufacture comprising a central shaft, driving means for rotating continuously said central shaft, a first table loosely mounted on said central shaft, means rotating said first table continuously about said central shaft in a given direction, a lever pivotally connected to said first table, a second table loosely mounted on said central shaft and provided with means co-acting with said lever, and means driven continuously by said central shaft co-acting with said lever to cause the latter to pivot and thereby intermittently rotate said second table in said given direction.

6. A rotatable support for products in the process of manufacture as claimed in claim 5 wherein the transmission ratio between said central shaft and said first table corresponds to $$\frac{n}{p+1}$$

where $n$ represents the number of revolutions of the central shaft and $p$ represents the number of positions per revolution of the second table.

7. A rotatable support for products in the process of manufacture comprising a central shaft, driving means for rotating continuously said central shaft, a first table loosely mounted on said central shaft, means rotating said first table continuously about said central shaft in a given direction, a lever pivotally connected to said first table, a second table loosely mounted in a spaced, superposed relation to said first table on said central shaft and provided with means co-acting with said lever, and means driven continuously by said central shaft co-acting with said lever to cause the latter to pivot and thereby intermittently rotate said second table in said given direction.

8. A rotatable support for products in the process of manufacture comprising a central shaft, driving means for rotating continuously said central shaft, a first table loosely mounted on said central shaft, means rotating said first table continuously about said central shaft in a given direction, a lever pivotally connected to said first table, a second table loosely mounted on said central shaft and provided with a projection co-acting with said lever, and cam means driven continuously by said central shaft co-acting with said lever to cause the latter to pivot and thereby intermittently rotate said second table in said given direction.

9. A rotatable support for products in the process of manufacture comprising a central shaft, driving means for rotating continuously said central shaft, a first table loosely mounted on said central shaft, means rotating said first table continuously about said central shaft in a given direction, a lever pivotally connected at one end to said first table and the other free end thereof being bifurcated, a second table loosely mounted on said central shaft and provided with a pin depending therefrom and engaged by the bifurcated end of said lever, and means driven continuously by said central shaft co-acting with said lever to cause the latter to pivot and thereby intermittently rotate said second table in said given direction.

References Cited in the file of this patent

UNITED STATES PATENTS

| | | |
|---|---|---|
| 1,461,222 | Myers | July 10, 1923 |
| 2,199,561 | Fuller et al. | May 7, 1940 |
| 2,626,702 | Basus | Jan. 27, 1953 |